(12) United States Patent
Huang et al.

(10) Patent No.: US 12,552,199 B2
(45) Date of Patent: Feb. 17, 2026

(54) WHEEL CONNECTING STRUCTURE AND BABY CARRIER

(71) Applicant: Wonderland Switzerland AG, Steinhausen (CH)

(72) Inventors: Jihua Huang, Steinhausen (CH); Zhengwen Guo, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/603,198

(22) Filed: Mar. 12, 2024

(65) Prior Publication Data

US 2024/0217266 A1 Jul. 4, 2024

Related U.S. Application Data

(63) Continuation of application No. 17/900,883, filed on Sep. 1, 2022, now Pat. No. 11,958,314.

(30) Foreign Application Priority Data

Sep. 1, 2021 (CN) .......................... 202111022631.X (51) Int. Cl.
*B60B 33/00* (2006.01)
*B62B 7/00* (2006.01)
*F16C 33/66* (2006.01)

(52) U.S. Cl.
CPC ............ *B60B 33/0015* (2013.01); *B62B 7/00* (2013.01); *F16C 33/66* (2013.01)

(58) Field of Classification Search
CPC ............ B60B 33/0015; B60B 33/0026; B60B 33/006; B60B 33/0065; B60B 33/0068; B60B 33/0028; B60B 33/0055; B60B 33/0094; B60B 33/0039; B60B 33/0049; B60B 33/0057; B60B 33/0081; B60B 33/0084; B60B 33/0092; B60B 33/02;
(Continued)

(56) References Cited

U.S. PATENT DOCUMENTS 4,205,413 A 6/1980 Collignon
4,349,938 A 9/1982 Fontana
(Continued)

FOREIGN PATENT DOCUMENTS

CN 200971028 Y 11/2007
CN 202669381 1/2013
(Continued)

OTHER PUBLICATIONS

Office action mailed/issued on Jan 3, 2024 for TW application No. 111133084, filing date: Sep. 1, 2022, pp. 1-6. ,Jan. 3, 2024.
(Continued)

*Primary Examiner* — Chuck Y Mah
(74) *Attorney, Agent, or Firm* — Winston Hsu (57) ABSTRACT

The present disclosure relates to a wheel connecting structure and a baby carrier. The wheel connecting structure includes a fixed base, a rotatable base, a rotating shaft and an anti-swing member. The rotatable base is rotatably connected to the fixed base by the rotating shaft. The anti-swing member has an abutting portion. The anti-swing member is arranged on one of the fixed base and the rotatable base, and the abutting portion abuts against the other of the fixed base and the rotatable base. The abutting portion is provided with a lubricating structure.

12 Claims, 9 Drawing Sheets

(58) Field of Classification Search
CPC ... B60B 33/025; B60B 33/021; B60B 33/023; B60B 33/0042; B60B 33/0073; B60B 33/0078; B60B 33/0086; B60B 37/10; B60B 2200/222; B60B 2200/242; B60B 2900/531; B62B 7/00; B62B 7/04; B62B 7/042; F16D 49/00; F16D 65/42; F16D 2121/14; F16D 2125/32; F16C 33/66; A61G 7/0528
See application file for complete search history.

(56) References Cited

U.S. PATENT DOCUMENTS

| | | | |
|---|---|---|---|
| 4,432,116 | A | 2/1984 | Schultz |
| 4,847,945 | A | 7/1989 | Schwartz |
| 5,390,393 | A | 2/1995 | Reppert |
| 5,809,612 | A | 9/1998 | Finch |
| 6,212,733 | B1 | 4/2001 | Yeh |
| 2003/0019076 | A1 | 1/2003 | Nagai |
| 2008/0078059 | A1 | 4/2008 | Chen |
| 2012/0056393 | A1 | 3/2012 | Funakura |
| 2016/0068180 | A1 | 3/2016 | Guo |

FOREIGN PATENT DOCUMENTS

| | | |
|---|---|---|
| CN | 104176104 A | 12/2014 |
| CN | 105128915 A | 12/2015 |
| CN | 105383542 A | 3/2016 |
| CN | 206277890 U | 6/2017 |
| CN | 111761991 | 10/2020 |
| CN | 211843957 | 11/2020 |
| JP | 3515842 B2 | 4/2004 |
| JP | 2009-149182 A | 7/2009 |
| JP | 2020-50304 A | 4/2020 |
| TW | 235004 | 11/1994 |
| TW | 200911594 A | 3/2009 |
| TW | 201609472 A | 3/2016 |
| WO | 2021122457 | 6/2021 |

OTHER PUBLICATIONS

Office action mailed/issued on May 7, 2025 for TW application No. 113135523, filing date: Sep. 1, 2022, pp. 1~8.

Office action mailed/issued on Jan. 1, 2026 for CN application No. 202111022631.X, filing date: Sep. 1, 2021, pp. 1~8.

WHEEL CONNECTING STRUCTURE AND BABY CARRIER

CROSS REFERENCE TO RELATED APPLICATIONS

This application is a continuation application of U.S. application Ser. No. 17/900,883, filed on Sep. 1, 2022. The content of the application is incorporated herein by reference.

BACKGROUND OF THE INVENTION

1. Field of the Invention

The present disclosure relates to the technical field of baby carrier, and in particular to a wheel connecting structure and a baby carrier.

2. Description of the Prior Art

At present, baby carriers on the market, such as strollers, are generally provided with universal wheels in order to facilitate turning during travelling. Such universal wheel generally has a structure that one end of a rotating shaft is fastened to one of a fixed base of a frame and a rotatable base of a wheel, and the other end of the rotating shaft is pivotally connected to the other of the fixed base of the frame and the rotatable base of the wheel, such that the rotatable base is capable of rotating 360 degrees with respect to the fixed base by the rotating shaft. Since the wheel needs to rotate, an allowable mounting gap needs to be presented between the fixed base of the frame and the rotatable base of the wheel. In this case, if the mounting gap is not suitable, the wheel is prone to swing. Therefore, the rotatable base is provided with an anti-swing member abutting against a surface of the fixed base facing toward the rotatable base.

SUMMARY OF THE INVENTION

According to some embodiments, a wheel connecting structure and a baby carrier are provided.

A wheel connecting structure includes a fixed base, a rotatable base, a rotating shaft and an anti-swing member. The rotatable base is rotatably connected to the fixed base by the rotating shaft. The anti-swing member has an abutting portion. The anti-swing member is arranged on one of the fixed base and the rotatable base, and the abutting portion abuts against the other of the fixed base and the rotatable base. The abutting portion is provided with a lubricating structure.

A baby carrier includes the aforementioned wheel connecting structure.

In one of the embodiments, the baby carrier further includes a frame and a wheel assembly. The fixed base is fastened to the frame, and the rotatable base is fastened to the wheel assembly.

These and other objects, advantages, purposes and features will become apparent upon review of the following specification in conjunction with the drawings.

BRIEF DESCRIPTION OF THE DRAWINGS

In order to illustrate the technical solutions of the embodiments of the present disclosure more clearly, the accompanying drawings required in the embodiments of the present disclosure will be briefly introduced below. Obviously, the drawings described below are only some embodiments of the present disclosure, and for those of ordinary skill in the art, other drawings can also be obtained from these drawings without creative effort.

DETAILED DESCRIPTION

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Elements that are identified using the same or similar reference characters refer to the same or similar elements.

It will be understood that, although the terms first, second, etc. may be used herein to describe various elements, these elements should not be limited by these terms. These terms are only used to distinguish one element from another. Thus, a first element could be termed a second element without departing from the teachings of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
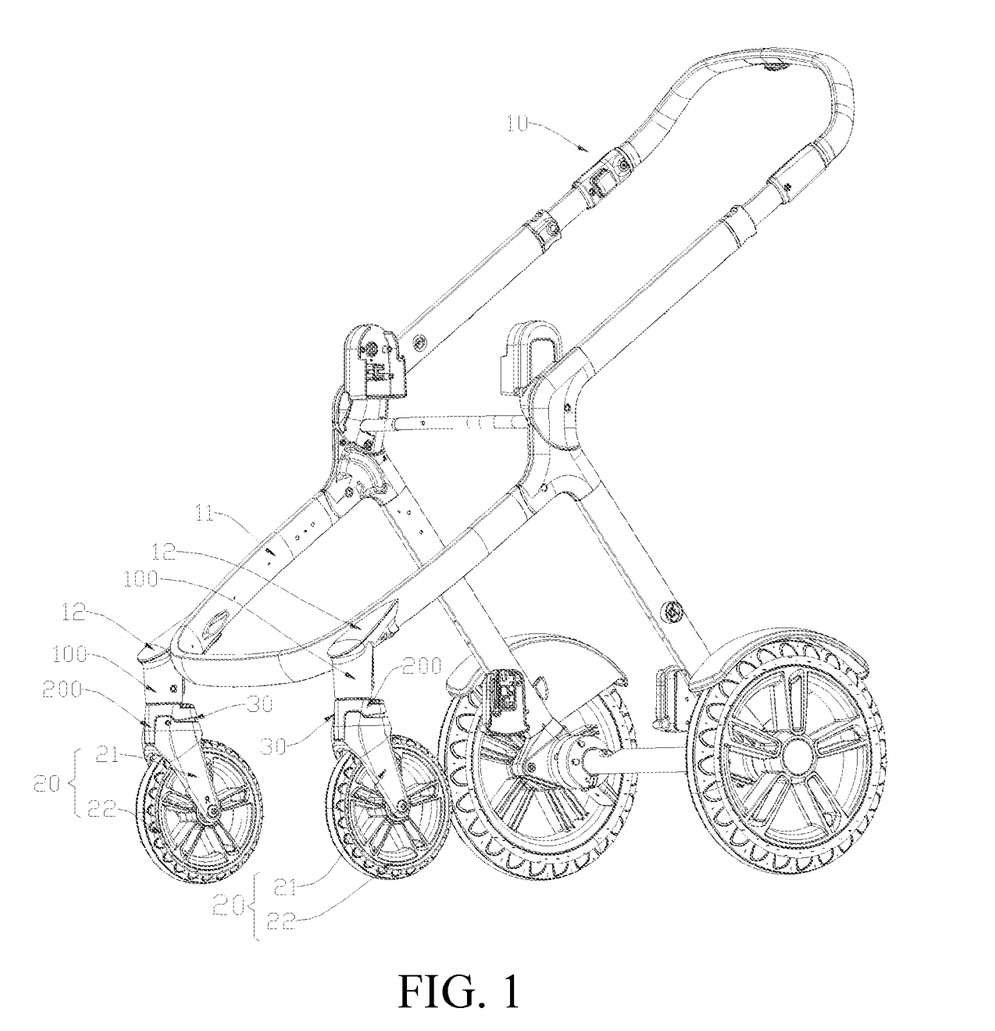
FIG. 1 is a schematic diagram illustrating a baby carrier according to an embodiment of the present disclosure.

As shown in FIG. 1, a baby carrier, such as a stroller, is provided according to an embodiment of the present disclosure. The baby carrier includes a frame 10, a wheel assembly 20 and a wheel connecting structure 30. The wheel connecting structure 30 and the baby carrier can ensure a smooth rotation of the wheel assembly 20 while preventing the wheel 22 from shimmy. In the prior art, the rotatable base is provided with an anti-swing member abutting against a surface of the fixed base facing toward the rotatable base in order to overcome the swing of the wheel, but such configuration also easily leads to an unsmooth rotation of the wheel.

Figure 2:
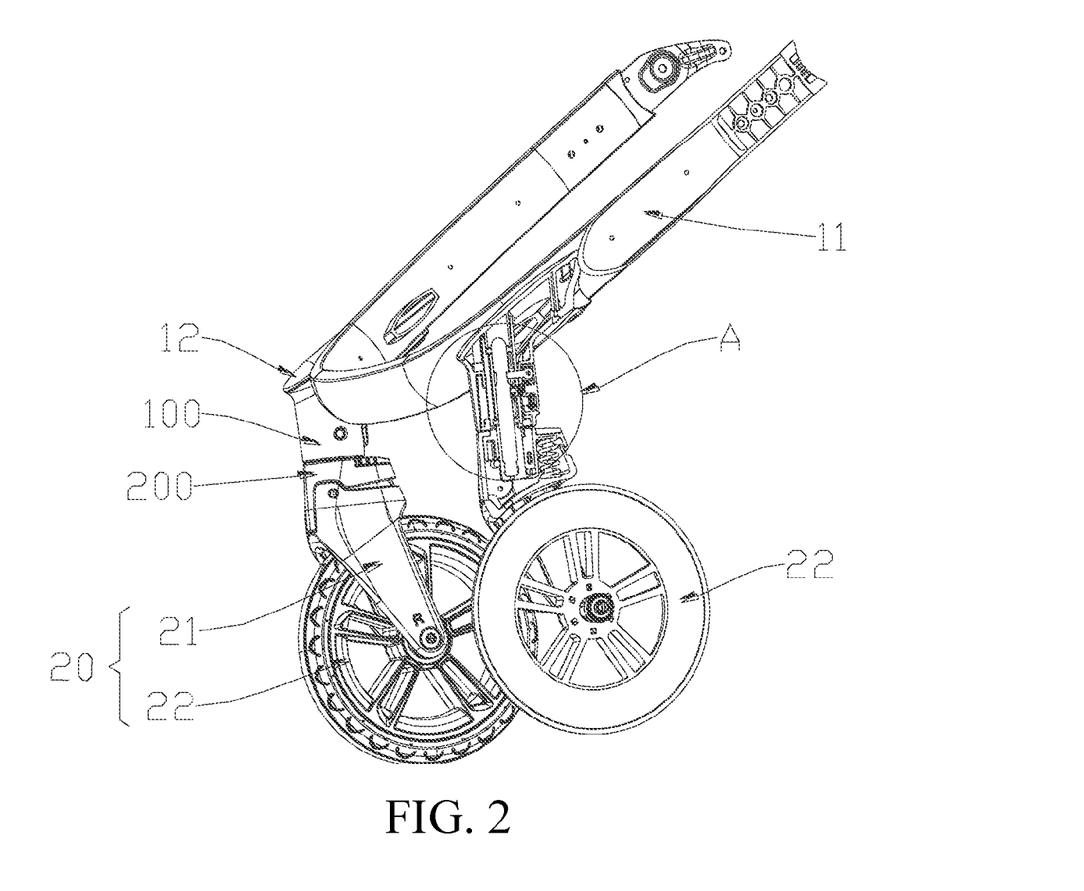
FIG. 2 is a partial sectional view of FIG. 1.

As shown in FIGS. 1 and 2, the frame 10 includes a main frame 11 and a front supporting member 12 fastened to a bottom of the main frame 11. In this embodiment, there are two front supporting members 12, which are located on two sides of a front end of the frame 10 respectively to support and balance the main frame 11. In other embodiments, there may also be more than two or less than two front supporting members 12 provided as required. The wheel assembly 20 includes a wheel base 21 and a wheel 22 pivotally connected to the wheel base 21. In this embodiment, there are two wheel assemblies 20 corresponding to the two front supporting members 12.

Figure 3:
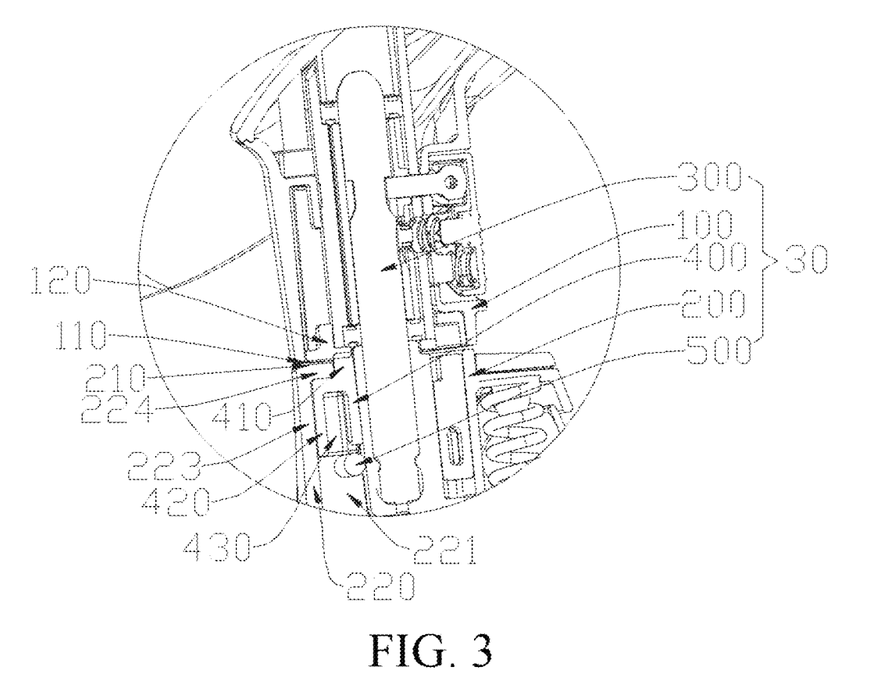
FIG. 3 is a partial enlarged view of portion A shown in FIG. 2.

As shown in FIGS. 2 and 3, there are two wheel connecting structures 30 corresponding to the two front supporting members 12. Each wheel connecting structure 30 includes a fixed base 100, a rotatable base 200, a rotating shaft 300, an anti-swing member 400 and a fixing pin 500.

Figure 4:
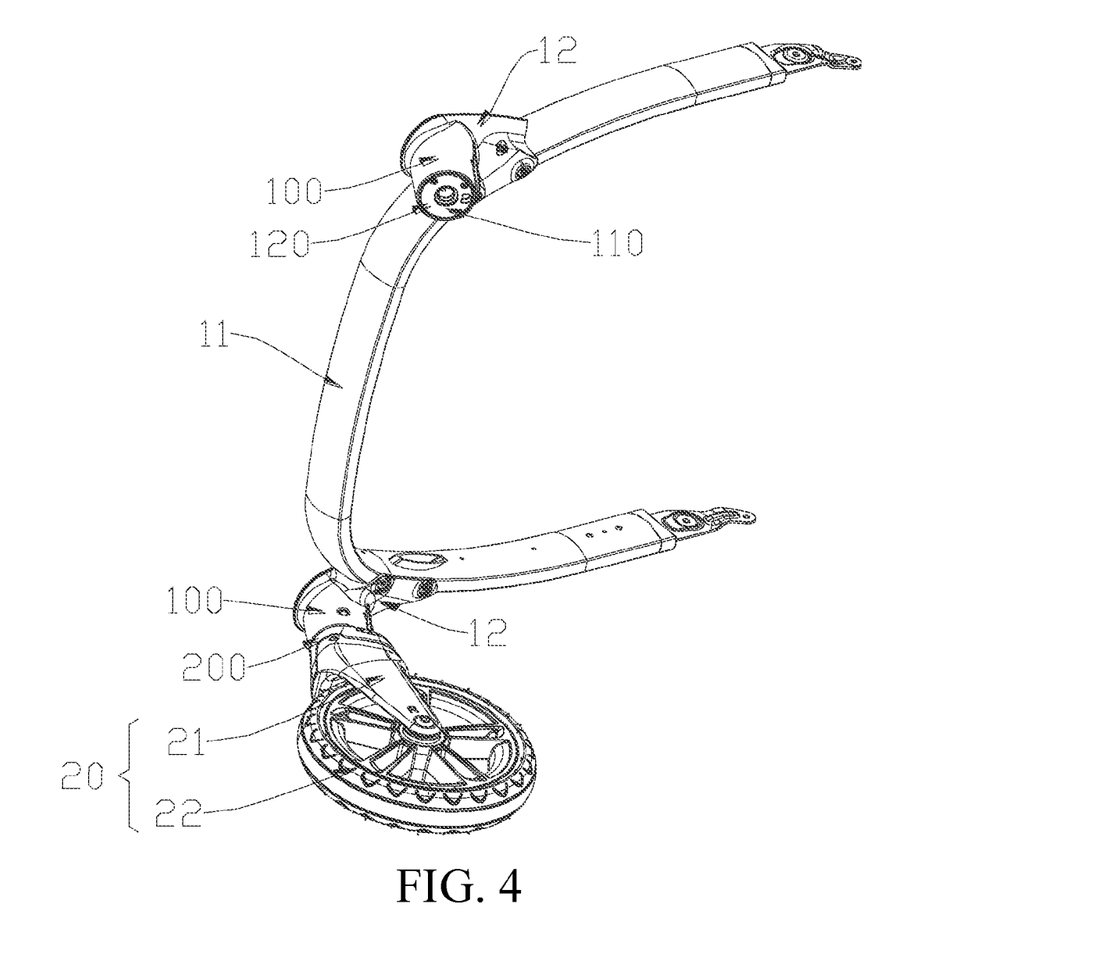
FIG. 4 is a partial schematic diagram of FIG. 1 in another perspective.
Figure 5:
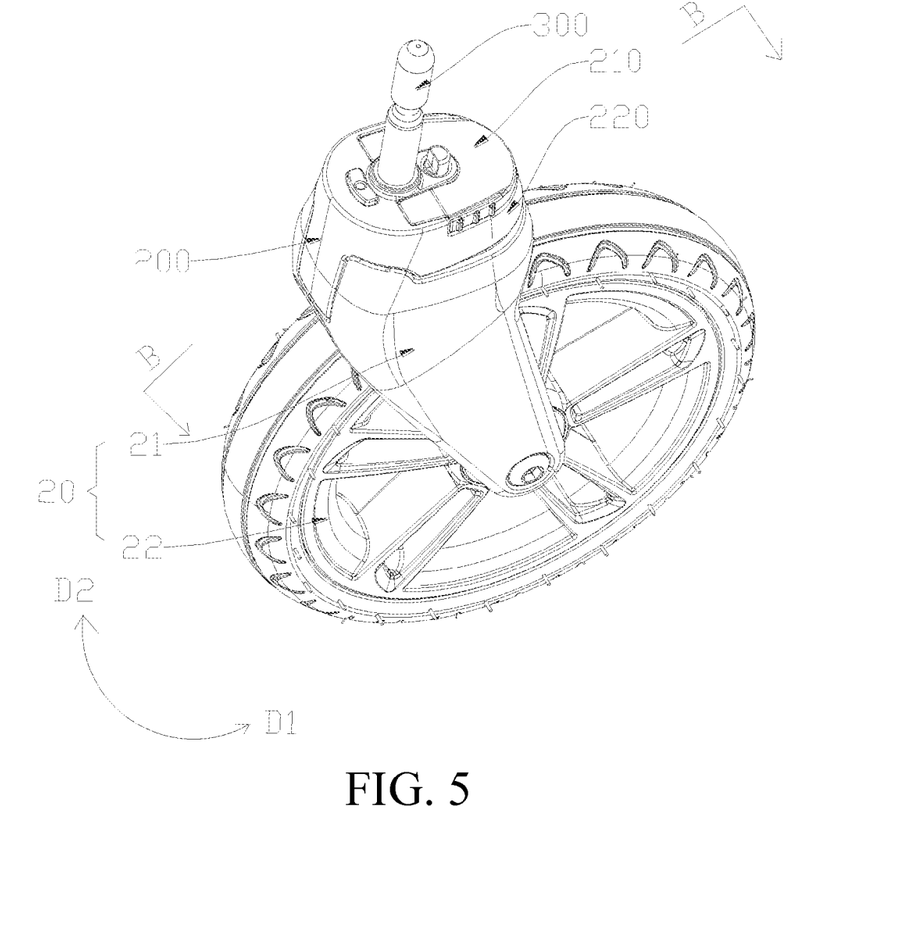
FIG. 5 is a schematic diagram illustrating a wheel assembly and a wheel connecting structure of the baby carrier shown in FIG. 1, where a fixed base is omitted.

As shown in FIGS. 3 to 5, the rotatable base 200 is rotatably connected to the fixed base 100 by the rotating shaft 300. In this embodiment, one end of the rotating shaft 300 is inserted and fixed in the rotatable base 200, and the other end of the rotating shaft 300 is inserted in and pivotally connected to the fixed base 100. In other embodiments, one end of the rotating shaft 300 is inserted in and pivotally connected to the rotatable base 200, and the other end thereof is inserted and fixed in the fixed base 100. The fixed base 100 has a first surface 110, and the rotatable base 200 has a second surface 210 facing toward the first surface 110. A mounting gap (not shown) is formed between the first surface 110 and the second surface 210. In this embodiment, the mounting gap is about 0.9 mm. In this embodiment, as shown in FIGS. 1 and 2, the fixed base 100 is fastened to the frame 10, and specifically to a bottom of the front supporting member 12. The rotatable base 200 is fastened to the wheel assembly 20, and specifically to a top of the wheel base 21. In this way, a rotation of the wheel assembly 20 relative to the frame 10 can be achieved. The presence of the mounting gap causes the wheel assembly 20 to easily swing back and forth along a first direction D1 and a second direction D2 as shown in FIG. 5, thereby causing the entire frame 10 to vibrate, and affecting the riding experience of the baby.

Figure 6:
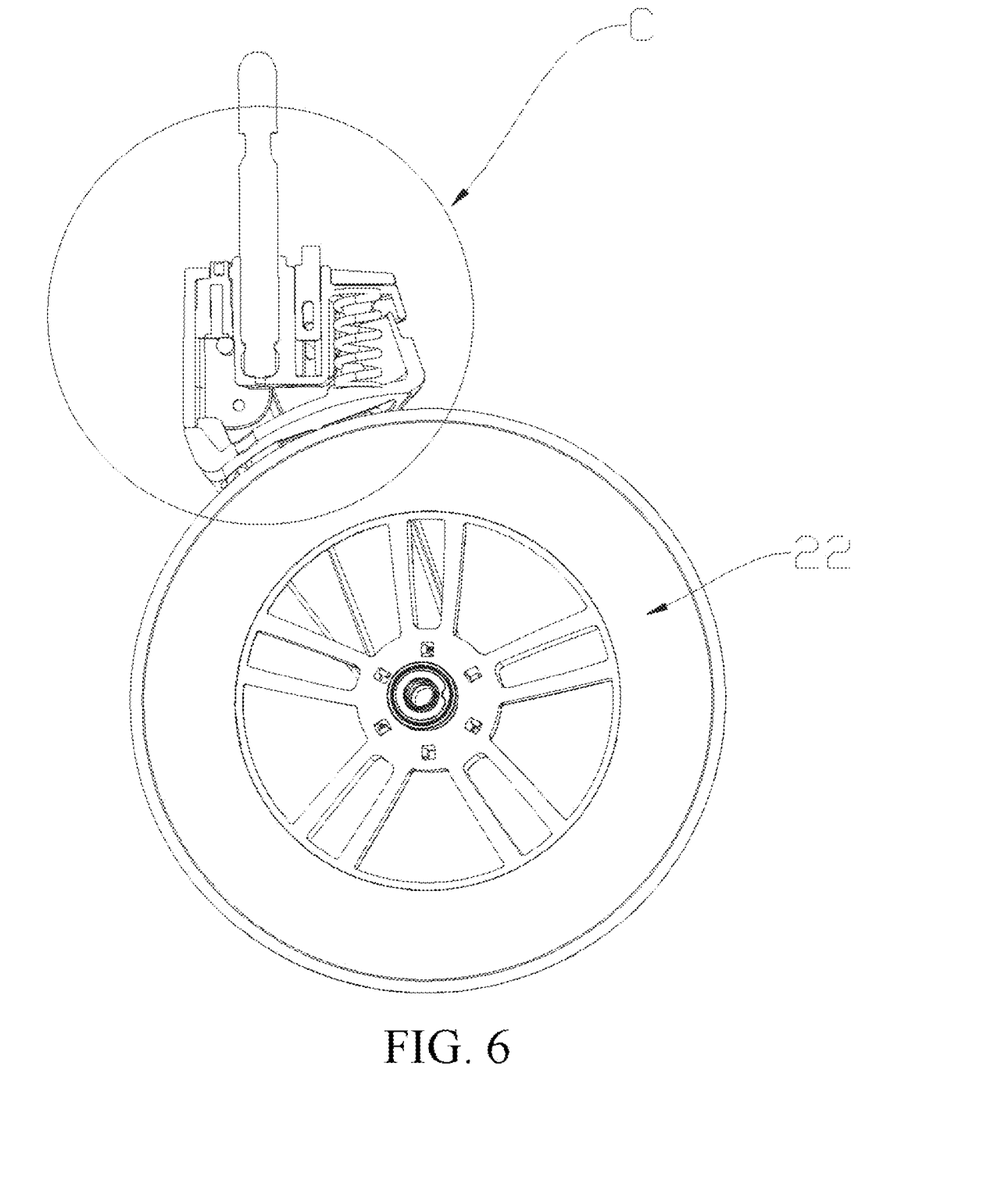
FIG. 6 is a sectional view along line B-B shown in FIG. 5.
Figure 7:
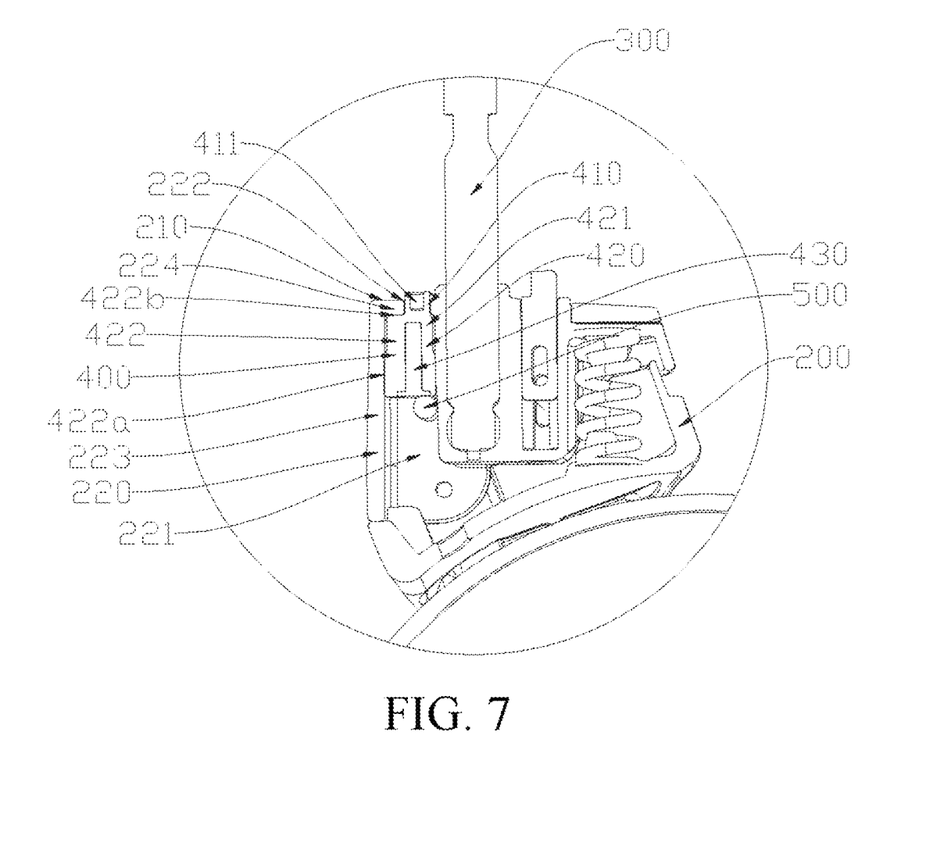
FIG. 7 is an enlarged view of portion C shown in FIG. 6.

As shown in FIG. 3, FIG. 6 and FIG. 7, the anti-swing member 400 has an abutting portion 410. The anti-swinging member 400 is arranged on one of the fixed base 100 and the rotatable base 200, and the abutting portion 410 abuts against the other of the fixed base 100 and the rotatable base 200. In this embodiment, the anti-swing member 400 is inserted and fixed in the rotatable base 200, and the abutting portion 410 of the anti-swinging member 400 abuts against the fixed base 100. Specifically, the fixed base 100 has a bottom cover 120 located at a bottom thereof, and the abutting portion 410 of the anti-swing member 400 abuts against the bottom cover 120. The bottom cover 120 is made of a plastic material, such as polyoxymethylene (POM) resin. The anti-swing member 400 has a substantially cylindrical structure and is arranged along an extending direction of the rotating shaft 300. An end of the anti-swing member 400 forms the abutting portion 410. The abutting portion 410 protrudes from the second surface 210 and abuts against the first surface 110.

Figure 9:
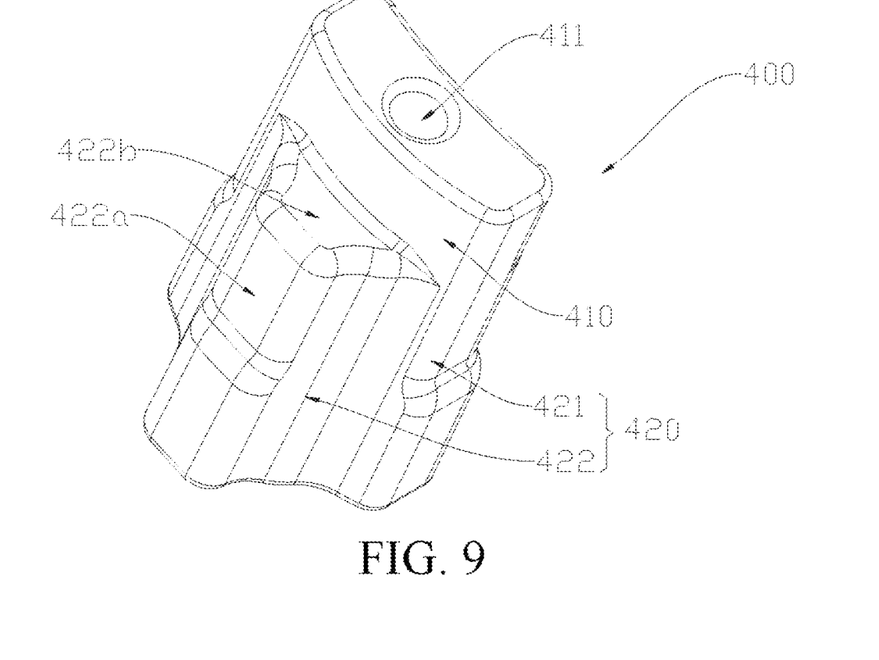
FIG. 9 is a schematic diagram illustrating the anti-swing member in the wheel connecting structure shown in FIG. 5.

As shown in FIGS. 6, 7 and 9, the abutting portion 410 is provided with a lubricating structure. In this way, the anti-swing member 400 can ensure a smooth rotation of the wheel 22 while preventing the wheel 22 from shimmy. In this embodiment, a surface of the abutting portion 410 abutting against the first surface 110 is provided with a lubricating groove 411 filled with a lubricating medium to form the lubricating structure. The lubricating medium in the lubricating groove 411 can provide lubrication performance between the fixed base 100 and the abutting portion 410, such that the anti-swing member 400 can ensure the smooth rotation of the wheel assembly 20 while preventing the wheel 22 from shimmy, and the structure is simple and easy to be implemented. In other embodiments, the lubricating structure may also be in other forms, for example, the lubricating structure may be a lubricating pad abutting against the first surface 110.

Optionally, the lubricating medium is lubricating oil. In other embodiments, the lubricating medium may also be lubricating grease, solid lubricant, gas lubricant, or the like. In this embodiment, the lubricating oil is lithium base oil. The lithium-base oil has excellent water resistance, mechanical stability, anti-wear and extreme pressure performance, water resistance and pumpability, rust resistance and oxidation stability, which has an excellent lubricating performance even under extremely harsh operating conditions. In other embodiments, the lubricating oil may also be silicone oil, silicate ester, phosphoric acid ester, fluorine oil, ester oil, synthetic hydrocarbon oil, or the like.

Further, as shown in FIGS. 6, 7 and 9, the anti-swing member 400 includes a main body post 421 and a mounting protrusion 422 protruding from a side of the main body post 421. The mounting protrusion 422 includes a first abutting surface 422a arranged substantially parallel to an axial direction of the main body post 421 and a second abutting surface 422b arranged substantially parallel to a radial direction of the main body post 421. One end of the main body post 421 has the abutting portion 410 protruding from the second abutting surface 422b. The rotatable base 200 includes a rotating housing 220. The rotating housing 220 is provided with a mounting cavity 221, and a mounting hole 222 in communication with the mounting cavity 221. The anti-swing member 400 is mounted in the mounting cavity 221. The mounting protrusion 422 abuts against both a side wall 223 and a top wall 224 of the rotating housing 220. Specifically, the first abutting surface 422a abuts against the side wall 223 of the rotating housing 220, and the second abutting surface 422b abuts against the top wall 224 of the rotating housing 220. The abutting portion 410 of the main body post 421 protrudes from the second surface 210 through the mounting hole 222 to abut against the first surface 110.

Figure 8:
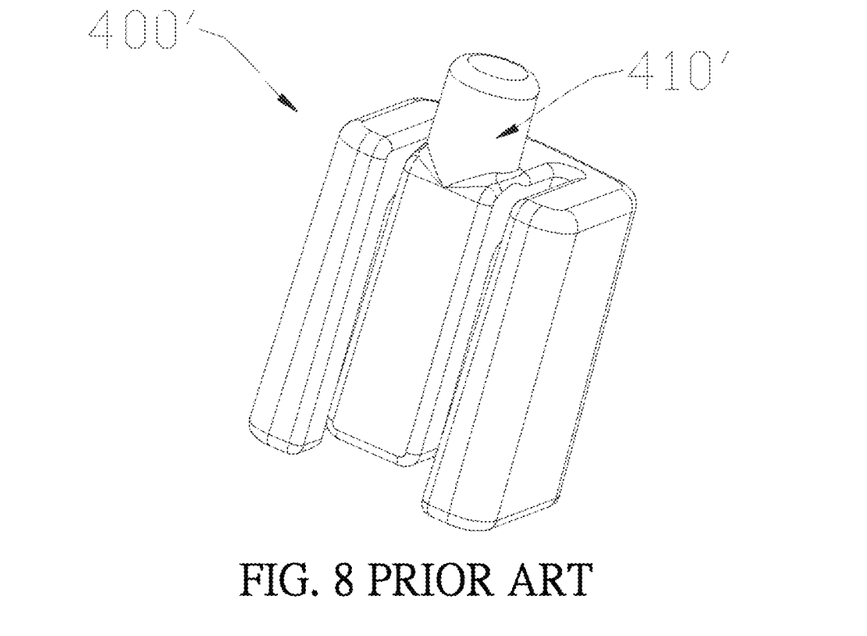
FIG. 8 is a schematic diagram illustrating an anti-swing member in the prior art.

In this embodiment, as shown in FIGS. 8 and 9, a length of the main body post 421 is about 25 mm, and the main body post 421 is a post with a substantially rectangular cross section. A width of the rectangular cross section is about 4 mm to 5 mm, for example, may be 4.5 mm. In this way, an abutting area between the abutting portion 410 and the fixed base 100 according to the present disclosure is much greater than that of the cylindrical abutting portion 410' of the anti-swing member 400' in the conventional art. The abutting portion 410 according to the present disclosure is subjected to relatively less pressure and is less prone to wear and deformation.

Further, as shown in FIGS. 6, 7 and 9, the lubricating groove 411 is a cylindrical groove to facilitate molding. In other embodiments, the lubricating groove 411 may also have other shapes. Optionally, an inner diameter of the cylindrical groove is in a range from 1.5 mm to 4.5 mm, for example, may be 3 mm. In this embodiment, a length of the anti-swing member 400 is about 25 mm. A depth of the cylindrical groove is in a range from 5 mm to 15 mm, for example, may be 5 mm.

Optionally, a hardness of the abutting portion 410 is in a range from 50 HRC to 70 HRC. In this hardness range, the material of the abutting portion 410 is relatively softer and less prone to wear, so as to prevent the abutting portion 410 of the anti-swing member 400 from being worn out and losing the anti-swing function during the use of the baby carrier, which results in the swing of the wheel 22. Optionally, the abutting portion 410 is made of silicone or a Hytrel material. In this embodiment, the abutting portion 410 is made of silicone with a hardness of about 70 HRC. The silicone has a good wear resistance and is cheap and easily available. In other embodiments, the abutting portion 410 may also be made of a Hytrel material with a hardness of 50 HRC.

Figure 10:
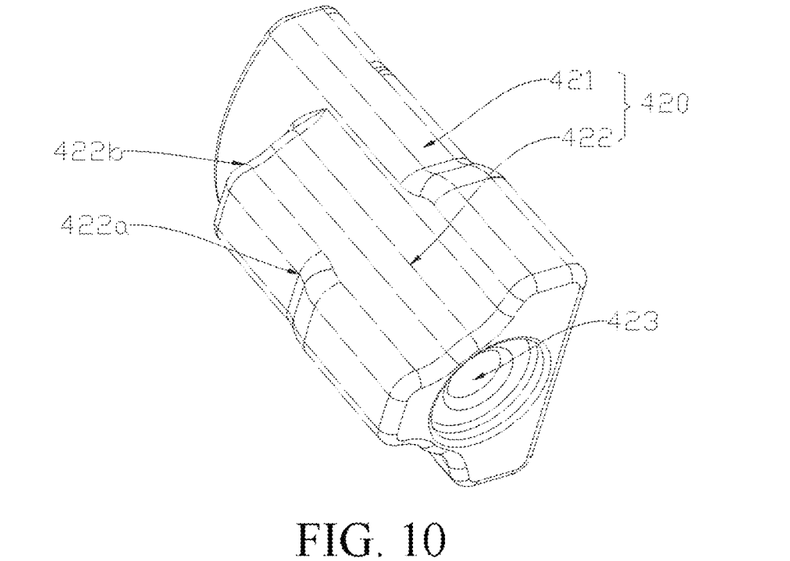
FIG. 10 is a schematic diagram illustrating the anti-swing member shown in FIG. 9 in another perspective, where the positioning member is omitted.
Figure 11:
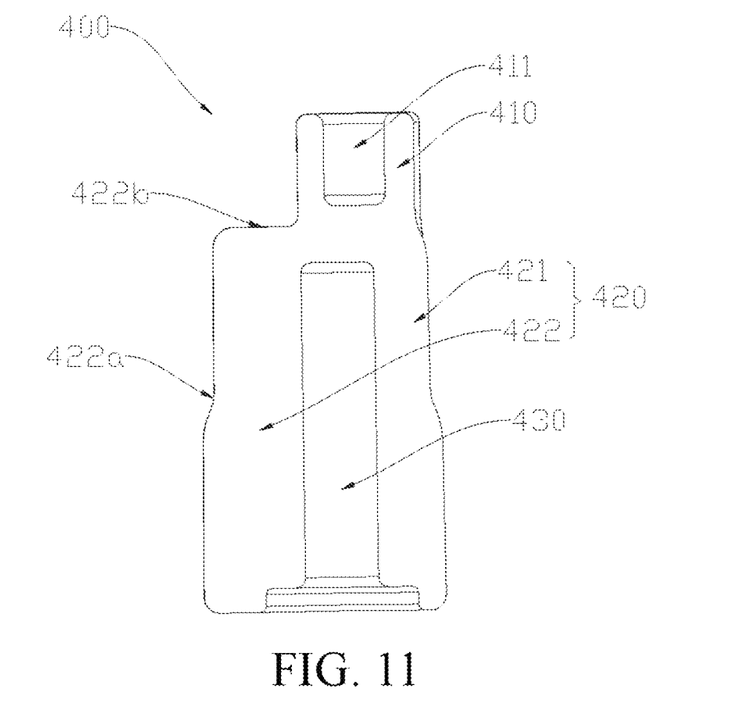
FIG. 11 is a sectional view of the anti-swing member in the wheel connecting structure shown in FIG. 5.

As shown in FIGS. 9 to 11, the anti-swing member 400 includes a fixing body 420 and a positioning member 430. The fixing body 420 includes a main body post 421 and a mounting protrusion 422. In this embodiment, the fixing body 420 has an integrally formed structure. In other embodiments, the fixing body 420 may also have a structure formed by connecting the main body post 421 and the mounting protrusion 422 that are mutually independent. An end of the fixing body 420 is formed with the abutting portion 410, and an end of the fixing body 420 away from the abutting portion 410 is provided with a mounting groove 423. The positioning member 430 is inserted and fixed in the mounting groove 423.

As shown in FIGS. 3 and 7, the fixing pin 500 is arranged on one of the fixed base 100 and the rotatable base 200. In this embodiment, both the fixing pin 500 and the anti-swing member 400 are mounted in the rotatable base 200. An end of the anti-swing member 400 away from the abutting portion 410 abuts against the fixing pin 500. The fixing pin 500 abuts against the end of the anti-swing member 400 away from the abutting portion 410, such that the anti-swing member 400 abuts against the fixed base 100 with the abutting portion 410, thereby realizing the function of the anti-swing member 400 to prevent the wheel 22 from swinging, and also making the mounting of the anti-swing member 400 more stable, and the anti-swing member 400 not easy to be displaced.

The aforementioned wheel connecting structure 30 and the baby carrier have at least the following technical effects.

In the wheel connecting structure 30, the rotatable base 200 is rotatably connected to the fixed base 100 by the rotating shaft 300, which enables the rotatable base 200 to rotate with respect to the fixed base 100, and facilitates a change of direction of the wheel assembly 20. By providing an anti-swing member 400 between the fixed base 100 and the rotatable base 200, the swing of the wheel assembly 20 is reduced, and meanwhile, by providing a lubricating structure on the abutting portion 410 of the anti-swing member 400 abutting against the fixed base 100 or the rotatable base 200, a smooth rotation of the wheel assembly 20 can be ensured while preventing the wheel 22 from swinging.

The technical features of the aforementioned embodiments may be combined arbitrarily. To simplify the description, not all possible combinations of the technical features in the aforementioned embodiments are described. However, all of the combinations of these technical features should be considered as within the scope of the present disclosure, as long as there is no contradiction in these combinations.

The aforementioned examples merely illustrate several embodiments of the present disclosure, and the description thereof is specific and detailed, but it shall not be construed as limiting the scope of the disclosure. It should be noted that a plurality of variations and modifications may be made by those skilled in the art without departing from the scope of the present disclosure, which are all within the scope of protection of the present disclosure. Therefore, the protection scope of the present disclosure shall be defined by the appended claims.

What is claimed is:

1. A wheel connecting structure, comprising:
   a fixed base;
   a rotatable base;
   a rotating shaft; and
   an anti-swing member, wherein the rotatable base is rotatably connected to the fixed base by the rotating shaft, the anti-swing member comprises a fixing body and a positioning member, the anti-swing member is arranged along an extending direction of the rotating shaft, an end of the fixing body is formed with an abutting portion, an end of the fixing body away from the abutting portion is provided with a mounting groove, and the positioning member is inserted and fixed in the mounting groove;
   wherein the rotatable base is provided with a mounting cavity; the anti-swing member is mounted in the mounting cavity; and the abutting portion protrudes out of the mounting cavity to abut against the fixed base.

2. The wheel connecting structure of claim 1, wherein the fixed base has a first surface, the rotatable base has a second surface facing toward the first surface, the anti-swing member is arranged on the rotatable base, the abutting portion protrudes from the second surface and abuts against the first surface, a surface of the abutting portion abutting against the first surface is provided with a lubricating groove, and the lubricating groove is filled with lubricating medium to form a lubricating structure.

3. The wheel connecting structure of claim 2, wherein the lubricating medium includes lubricating oil.

4. The wheel connecting structure of claim 3, wherein the lubricating oil includes lithium-base oil.

5. The wheel connecting structure of claim 2, wherein the lubricating groove is a cylindrical groove.

6. The wheel connecting structure of claim 5, wherein the lubricating groove has an inner diameter in a range from 1.5 mm to 4.5 mm, and a depth in a range from 5 mm to 25 mm.

7. The wheel connecting structure of claim 1, wherein the abutting portion has a hardness in a range from 50 HRC to 70 HRC.

8. The wheel connecting structure of claim 7, wherein the abutting portion is made of silicone or a Hytrel material.

9. The wheel connecting structure of claim 1, wherein the abutting portion is provided with a lubricating structure.

10. The wheel connecting structure of claim 1, further comprising a fixing pin, wherein the fixing pin is arranged on the rotatable base, and an end of the anti-swing member away from the abutting portion abuts against the fixing pin.

11. A baby carrier, comprising the wheel connecting structure of claim 1.

12. The baby carrier of claim 11, further comprising a frame and a wheel assembly, wherein the fixed base is fastened to the frame, and the rotatable base is fastened to the wheel assembly.

* * * * *